(12) United States Patent
Choate et al.

(10) Patent No.: US 11,920,687 B2
(45) Date of Patent: Mar. 5, 2024

(54) VALVE END REPLACEMENT SYSTEM AND METHOD

(71) Applicant: Baker Hughes Oilfield Operations LLC, Houston, TX (US)

(72) Inventors: Jeremy Choate, Houston, TX (US); Keith M. Adams, Katy, TX (US); Lloyd Cheatham, Lake Jackson, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 152 days.

(21) Appl. No.: 16/829,523

(22) Filed: Mar. 25, 2020

(65) Prior Publication Data

US 2021/0301938 A1   Sep. 30, 2021

(51) Int. Cl.
*F16K 3/02* (2006.01)
*F16D 1/104* (2006.01)
*F16K 27/00* (2006.01)

(52) U.S. Cl.
CPC ............ *F16K 27/003* (2013.01); *F16D 1/104* (2013.01)

(58) Field of Classification Search
CPC ................ F16K 3/0272; F16K 3/0281; Y10T 137/9029; F16L 37/252
USPC ............................... 285/292.1, 401; 251/148
See application file for complete search history.

(56) References Cited

U.S. PATENT DOCUMENTS

| | | |
|---|---|---|
| 2,610,820 A | 9/1952 | Markel |
| 2,786,644 A | 3/1957 | Koppl |
| 2,935,166 A | 9/1960 | Carlson, Jr. |
| 3,082,792 A | 3/1963 | Jenkins |
| 3,115,068 A | 12/1963 | Lofink |
| 3,139,898 A | 7/1964 | Wiltgen |
| 3,146,682 A | 9/1964 | Price et al. |

(Continued)

FOREIGN PATENT DOCUMENTS

| | | |
|---|---|---|
| CN | 2121592 | 11/1992 |
| CN | 101093034 | 12/2007 |

(Continued)

OTHER PUBLICATIONS

A PCT International Preliminary Report on Patentability issued in connection with corresponding PCT Application No. PCT/US2016/036328 dated Dec. 21, 2017.

(Continued)

*Primary Examiner* — Kevin F Murphy
(74) *Attorney, Agent, or Firm* — Hogan Lovells US LLP (57) ABSTRACT

A valve assembly includes an actuator adapted to drive movement of a valve member. The valve assembly also includes a bonnet coupled to the actuator, a valve body coupled to the bonnet, and a fluid end coupled to the valve body. The valve assembly further includes a quick connection system adapted to couple the fluid end to the valve body. The quick connection system includes a plurality of valve body lugs separated by a plurality of spaces, the plurality of valve body lugs extending radially outward from an axis. The quick connection system also includes a plurality of fluid end lugs configured to interact with the plurality of valve body lugs, the plurality of valve body lugs being arranged to axially align with the plurality of fluid end lugs to block axial movement of the fluid end with respect to the valve body.

17 Claims, 5 Drawing Sheets

(56) References Cited

U.S. PATENT DOCUMENTS

| | | |
|---|---|---|
| 3,175,473 A | 3/1965 | Boteler et al. |
| 3,249,117 A | 5/1966 | Edwarde |
| 3,293,992 A | 12/1966 | Baumann |
| 3,380,470 A | 4/1968 | Culpepper, Jr. et al. |
| 3,593,959 A | 7/1971 | Greene |
| 3,792,717 A | 2/1974 | Tibbals |
| 3,811,457 A | 5/1974 | Crossman |
| 3,882,400 A | 5/1975 | Lewis |
| 3,955,793 A | 5/1976 | Burkhardt et al. |
| 3,958,592 A | 5/1976 | Wells |
| 3,993,284 A | 11/1976 | Lukens, Jr. |
| 4,059,250 A | 11/1977 | Guldener |
| 4,135,546 A | 1/1979 | Morrison |
| 4,135,547 A | 1/1979 | Akkerman |
| 4,187,764 A | 2/1980 | Cho |
| 4,274,432 A | 6/1981 | Tunstall et al. |
| 4,281,819 A | 8/1981 | Linder |
| 4,309,022 A | 1/1982 | Reinicke et al. |
| 4,354,425 A | 10/1982 | Bruton et al. |
| 4,424,738 A | 1/1984 | Leighton |
| 4,468,039 A | 8/1984 | Le |
| 4,480,811 A | 11/1984 | Card et al. |
| 4,489,756 A | 12/1984 | Balz |
| 4,491,060 A | 1/1985 | Boski |
| 4,527,769 A | 7/1985 | Stogner et al. |
| 4,529,330 A | 7/1985 | Boski |
| 4,585,207 A | 4/1986 | Shelton |
| 4,620,562 A | 11/1986 | Pacht |
| 4,624,442 A | 11/1986 | Duffy et al. |
| 4,633,898 A | 1/1987 | Denk |
| 4,650,151 A | 3/1987 | McIntyre |
| 4,721,284 A | 1/1988 | Bankard |
| 4,768,545 A | 9/1988 | Hoffman |
| 4,782,852 A * | 11/1988 | Legris .................. F16L 37/252 137/269 |
| 4,871,143 A | 10/1989 | Baker |
| 4,934,403 A | 6/1990 | Mooney et al. |
| 4,959,506 A * | 9/1990 | Petty .................. H02G 3/14 174/669 |
| 4,967,785 A | 11/1990 | Young |
| 5,067,392 A | 11/1991 | Gautier |
| 5,294,090 A | 3/1994 | Winnike |
| 5,377,955 A | 1/1995 | Baker |
| 5,464,040 A | 11/1995 | Johnson |
| 5,499,648 A | 3/1996 | Powell et al. |
| 5,964,446 A | 10/1999 | Walton et al. |
| 6,015,134 A | 1/2000 | Johnson |
| 6,041,804 A | 3/2000 | Chatufale |
| 6,050,541 A | 4/2000 | Chatufale |
| 6,086,039 A | 7/2000 | Sievers et al. |
| 6,089,531 A | 7/2000 | Young |
| 6,131,881 A * | 10/2000 | Preisser ................ F16L 37/113 251/148 |
| 6,397,892 B1 | 6/2002 | Pyle et al. |
| 6,487,960 B1 | 12/2002 | Chatufale |
| 6,659,419 B2 | 12/2003 | Chatufale |
| 6,672,331 B2 | 1/2004 | Heald |
| 6,684,897 B2 | 2/2004 | Sundararajan |
| 6,854,704 B1 | 2/2005 | Young |
| 7,124,774 B2 | 10/2006 | Weingarten |
| 7,159,839 B2 | 1/2007 | Tanikawa et al. |
| 7,261,121 B2 * | 8/2007 | Bordonaro ............ F16K 27/003 137/269 |
| 7,261,122 B2 * | 8/2007 | Bordonaro .......... F15B 13/0817 137/269 |
| 7,481,239 B2 * | 1/2009 | McGuire .............. F16K 3/0236 137/242 |
| 7,647,861 B2 | 1/2010 | Bessman |
| 8,282,070 B2 | 10/2012 | Davies, Jr. |
| 8,322,359 B2 | 12/2012 | Zecchi et al. |
| 8,708,309 B2 | 4/2014 | Roper et al. |
| 8,864,102 B2 | 10/2014 | Gamache |
| 8,910,658 B2 | 12/2014 | Adams et al. |
| 8,991,420 B2 | 3/2015 | Adams et al. |
| 8,998,166 B2 | 4/2015 | Adams et al. |
| 9,033,308 B2 | 5/2015 | Kiesbauer et al. |
| 9,212,758 B2 * | 12/2015 | Adams .................... F15B 15/10 |
| 9,568,117 B2 | 2/2017 | Adams et al. |
| 9,759,240 B2 | 9/2017 | McEvoy et al. |
| 10,378,659 B2 * | 8/2019 | Scott ..................... F16K 3/0281 |
| 11,125,343 B2 * | 9/2021 | Choate .................. F16K 27/067 |
| 2002/0175303 A1 | 11/2002 | Chatufale |
| 2003/0034465 A1 | 2/2003 | Adams et al. |
| 2003/0052293 A1 | 3/2003 | Enzaki |
| 2004/0007682 A1 | 8/2004 | Engle et al. |
| 2005/0087712 A1 | 4/2005 | Lymberopoulos |
| 2007/0290154 A1 | 12/2007 | Aoyama |
| 2009/0095933 A1 | 4/2009 | McGuire |
| 2009/0095934 A1 | 4/2009 | Cain |
| 2011/0240126 A1 | 10/2011 | Lymberopoulos et al. |
| 2012/0227983 A1 | 9/2012 | Lymberopoulos et al. |
| 2012/0318388 A1 | 12/2012 | Du |
| 2014/0000907 A1 | 1/2014 | Olvera |
| 2014/0138564 A1 | 5/2014 | Adams et al. |
| 2014/0174554 A1 | 6/2014 | Meyberg et al. |
| 2014/0183396 A1 * | 7/2014 | Hunter ..................... F16K 3/30 251/328 |
| 2014/0217320 A1 | 8/2014 | DeOcampo |
| 2014/0332707 A1 | 11/2014 | Reilly |
| 2015/0204456 A1 | 7/2015 | Adams et al. |
| 2016/0312904 A1 * | 10/2016 | Hoang .................. E21B 33/063 |
| 2017/0191570 A1 | 7/2017 | Roberts |
| 2017/0343108 A1 * | 11/2017 | Hoang ................ F16J 15/0887 |
| 2018/0156338 A1 | 6/2018 | Sundararajan |
| 2019/0195386 A1 * | 6/2019 | Choate ................ F16K 31/1221 |
| 2019/0264818 A1 | 8/2019 | Powell |
| 2019/0277409 A1 | 9/2019 | Puranik |

FOREIGN PATENT DOCUMENTS

| | | |
|---|---|---|
| CN | 202302237 | 7/2012 |
| CN | 202432085 | 9/2012 |
| DE | 102011015646 | 10/2012 |
| EP | 0416966 | 3/1991 |
| EP | 0486824 | 5/1992 |
| FR | 1195213 | 11/1959 |
| GB | 1148817 | 4/1969 |
| GB | 2022704 | 12/1979 |
| GB | 2168787 | 6/1986 |
| GB | 2303199 | 2/1997 |
| JP | 2008069795 | 3/2008 |
| JP | 2010048271 | 3/2010 |
| WO | 2014099505 | 6/2014 |

OTHER PUBLICATIONS

Actuators Pressure Control CHA Top Access Standard Hydraulic Actuator, GE Oil & Gas, 2013.

International Search Report and Written Opinion issued in connection with related PCT Application No. PCT/US2013/067666, dated Mar. 3, 2014.

International Search Report and Written Opinion issued in connection with related PCT Application No. PCT/US13/077392, dated Mar. 7, 2014.

Non-Final Rejection towards related U.S. Appl. No. 13/679,553 dated Mar. 28, 2014.

International Search Report and Written Opinion issued in connection with related PCT Application No. PCT/US2013/074223 dated Apr. 3, 2014.

Non-Final Rejection towards related U.S. Appl. No. 13/717,073 dated Jul. 31, 2014.

Non-Final Rejection towards related U.S. Appl. No. 14/107,589 dated Aug. 13, 2014.

Final Rejection towards related U.S. Appl. No. 13/679,553 dated Oct. 17, 2014.

Notice of Allowance issued in connection with related U.S. Appl. No. 13/679,553 dated Nov. 21, 2014.

Non-Final Rejection towards related U.S. Appl. No. 14/673,178 dated Jul. 30, 2015.

(56) References Cited

OTHER PUBLICATIONS

International Search Report and Written Opinion issued in connection with related PCT Application No. PCT/US2015/49556, dated Nov. 19, 2015.
Actuators NoBolt Dual Seal Pneumatic Actuator, GE Oil & Gas, 2015.
A Office Action issued in connection with related CN Application No. 201380070284.5 dated May 25, 2016.
A Office Action issued in connection with related CN Application No. 201380074076.2 dated Jun. 30, 2016.
A Office Action issued in connection with related CN Application No. 201380070678.0 dated Jul. 5, 2016.
Non-Final Rejection towards related U.S. Appl. No. 14/673,178 dated Jul. 15, 2016.
PCT Search Report and Written Opinion for related application PCT/US2013/077412 dated Mar. 7, 2014.
U.S. Appl. No. 62/172,544, filed Jun. 8, 2015.
International Search Report and Written Opinion dated Jul. 5, 2021 in related PCT Application No. PCT/US2021/022689.
International Search Report and Written Opinion dated Jul. 5, 2021 in related PCT Application No. PCT/US2021/022692.
Office Action dated Nov. 10, 2021 in related U.S. Appl. No. 16/829,664.

\* cited by examiner

VALVE END REPLACEMENT SYSTEM AND METHOD

BACKGROUND

1. Field of the Invention

The present disclosure relates in general to valve systems and more particularly to systems and methods for replacing valve ends.

2. Description of Related Art

Valves are used in a variety of industries to regulate fluid flow. In certain industries, such as oil and gas drilling and recovery, the fluid flow may be at high pressures and may include particulates or acids that damage interior components of the valves. For example, particulates may impinge on valve seats, causing damage. Additionally, high pressures may lead to high flow rates, which may wash out or otherwise damage a flow bore that extends through the valve. Damaged valves are either replaced or repaired. Replacing valves may be expensive. However, repairing valves may lead to outages.

SUMMARY

Applicants recognized the problems noted above herein and conceived and developed embodiments of systems and methods, according to the present disclosure, for valve systems.

In an embodiment, a valve assembly includes an actuator adapted to drive movement of a valve member between an open position and a closed position. The valve assembly also includes a bonnet coupled to the actuator, a valve body coupled to the bonnet, and a fluid end coupled to the valve body. The valve assembly further includes a quick connection system adapted to couple the fluid end to the valve body. The quick connection system includes a plurality of valve body lugs separated by a plurality of spaces, the plurality of valve body lugs extending radially outward from an axis. The quick connection system also includes a plurality of fluid end lugs configured to interact with the plurality of valve body lugs, the plurality of valve body lugs being arranged to axially align with the plurality of fluid end lugs to block axial movement of the fluid end with respect to the valve body.

In another embodiment, a valve assembly includes an actuator configured to drive movement of a valve stem between a first position and a second position. The valve assembly also includes a valve body, having a chamber for a valve member coupled to the valve stem, wherein movement of the valve stem drives movement of the valve member between the first position and the second position. The valve assembly further includes a fluid end adapted to couple to the valve body, the fluid end having a plurality of fluid end lugs, extending radially outward from an axis and arranged circumferentially about the fluid end, the plurality of fluid end lugs separated by respective gaps of a plurality of gaps, the fluid end being translatable along the axis between a coupled position and a decoupled position, wherein the plurality of fluid end lugs axially move through a plurality of valve body slots as the fluid end transitions from the decoupled position to the decoupled position, and the fluid end is rotatably placed into the coupled position after moving through the plurality of valve body slots.

In an embodiment, a valve assembly includes a fluid end having a plurality of fluid end lugs extending radially outward from an axis, the plurality of fluid end lugs each having a first circumferential length less than an outer circumference of the fluid end, wherein each fluid end lug is separated from an adjacent fluid end lug by a gap, the plurality of fluid end lugs forming at least a portion of a fluid end slot. The valve assembly also includes a valve body having a plurality of valve body lugs extending radially inward toward the axis, the plurality of valve body lugs each having a second circumferential length less than an outer circumference of the valve body, wherein each valve body lug is separated from an adjacent valve body lug by a space. The first circumferential length is less than a space circumferential length to permit passage of the plurality fluid end lugs through respective space when the plurality fluid end lugs are aligned with the spaces, and wherein axial movement of the fluid end relative to the valve body is blocked when the plurality of valve body lugs, arranged within the fluid end slot, are axially aligned with the plurality of fluid end lugs.

BRIEF DESCRIPTION OF DRAWINGS

The present technology will be better understood on reading the following detailed description of non-limiting embodiments thereof, and on examining the accompanying drawings, in which.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, like reference numerals may be used for like components, but such use should not be interpreted as limiting the disclosure.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure.

Embodiments of the present disclosure include a quick connection system for end connections on valves, such as gate valves, using a lug system. As a result, valve ends may be replaced faster than traditional methods. In various embodiments, the end connection may be used to secure a valve seat within a valve body. Rapid removal of the valve end may facilitate faster replacement of the valve seat, thereby reducing costs associated with downtimes. Moreover, damaged components may be machined at an offsite location while the replacement is used, thereby enabling recycling and reuse of components after repair operations.

Embodiments of the present disclosure include the lug system, which may include a plurality of valve end lugs that interface with a plurality of body lugs. Spaces are arranged between adjacent respective lugs to enable pass through of opposing lugs. Thereafter, at least one of the fluid ends or the valve body may be rotated to align (e.g., at least partially overlap) the respective lugs, thereby blocking axial movement of the fluid ends relative to the valve body. Such a process may reduce or eliminate threaded fasteners used in the system, which may be time consuming to engage and disengage, and moreover, may be costly. Embodiments further enable fluid ends to be rapidly changed to modify a respective connector. For example, a flange may be rapidly added to a valve using embodiments of the present disclosure. As will be described below, in various embodiments, pockets may be formed to receive valve seats. Moreover, in embodiments, valve seats may be integrated into the fluid ends. Accordingly, embodiments are directed toward efficient replacement of fluid ends, which may include at least a portion of a flow bore extending through the valve.

Figure 1:
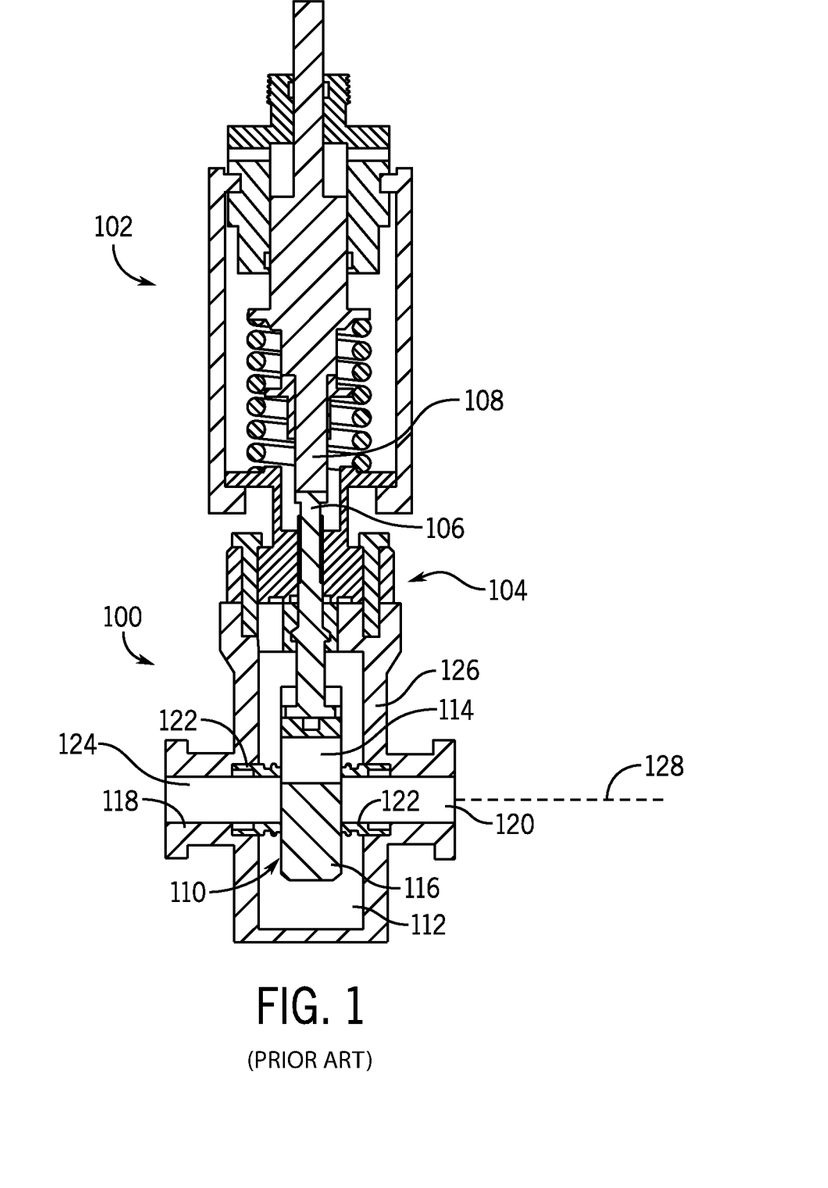
FIG. 1 is a schematic cross-sectional view of an embodiment of a valve assembly having an actuator, in accordance with embodiments of the present disclosure.

FIG. 1 is a cross-sectional side elevation view of an embodiment of a valve assembly 100 that includes an actuator 102 coupled to a bonnet 104. It should be appreciated that while the illustrated actuator 102 is an automated or controlled actuator, that manual operators may also be utilized within the scope of the present disclosure. The illustrated actuator 102 is coupled to a valve stem 106, via a connector 108 that extends through a central bore and couples to a valve member 110 arranged within a chamber 112. The illustrated valve member 110 includes a passage 114 and a block 116. As shown, fluid (e.g., gas, liquid, solid, or a combination thereof) may enter the valve 100 through an inlet passage 118 and engage the valve member 110 en route to an outlet passage 120. In the illustrated embodiment, the valve member 110 is transitioning between an open position, in which the passage 114 is substantially aligned with the inlet passage 118 and the outlet passage 120, and a closed position, in which the block 116 is substantially aligned with the inlet passage 118 and the outlet passage 120. The illustrated valve member 110 may seal against valve seats 122.

In operation, a bore 124 extends through a valve body 126 along a valve body axis 128. The fluid is at a pressure and travels through the bore 124, for example, when the valve member 110 is positioned in an open position. In certain operations, such as fracturing operations, the fluid may include particulates, such as proppant, that may erode sections of the valve body 126, for example, along the bore 124. Additionally, the fluid may contain corrosive materials and be at a high pressure, which may further damage the valve body 126. Accordingly, it may be desirable to replace portions of the valve body 126 and/or the valve seats 122 without replacing the entire valve assembly 100. As will be described herein, embodiments of the present disclosure provide for fluid end coupling systems that may include a fluid end that engages a valve body having an interlocking lug system that enables rapid attachment and detachment of the fluid end, and in certain embodiments, attachment and detachment absent fasteners such as bolts. As a result, various components of the valve body 126 may be replaced, such as portions of the flow bore 124 without replacing the entire valve body 126. Moreover, the seats 122 may be quickly replaced. Additionally, in embodiments, couplings at the valve ends may also be changed out using systems and methods of the present disclosure.

Figure 2:
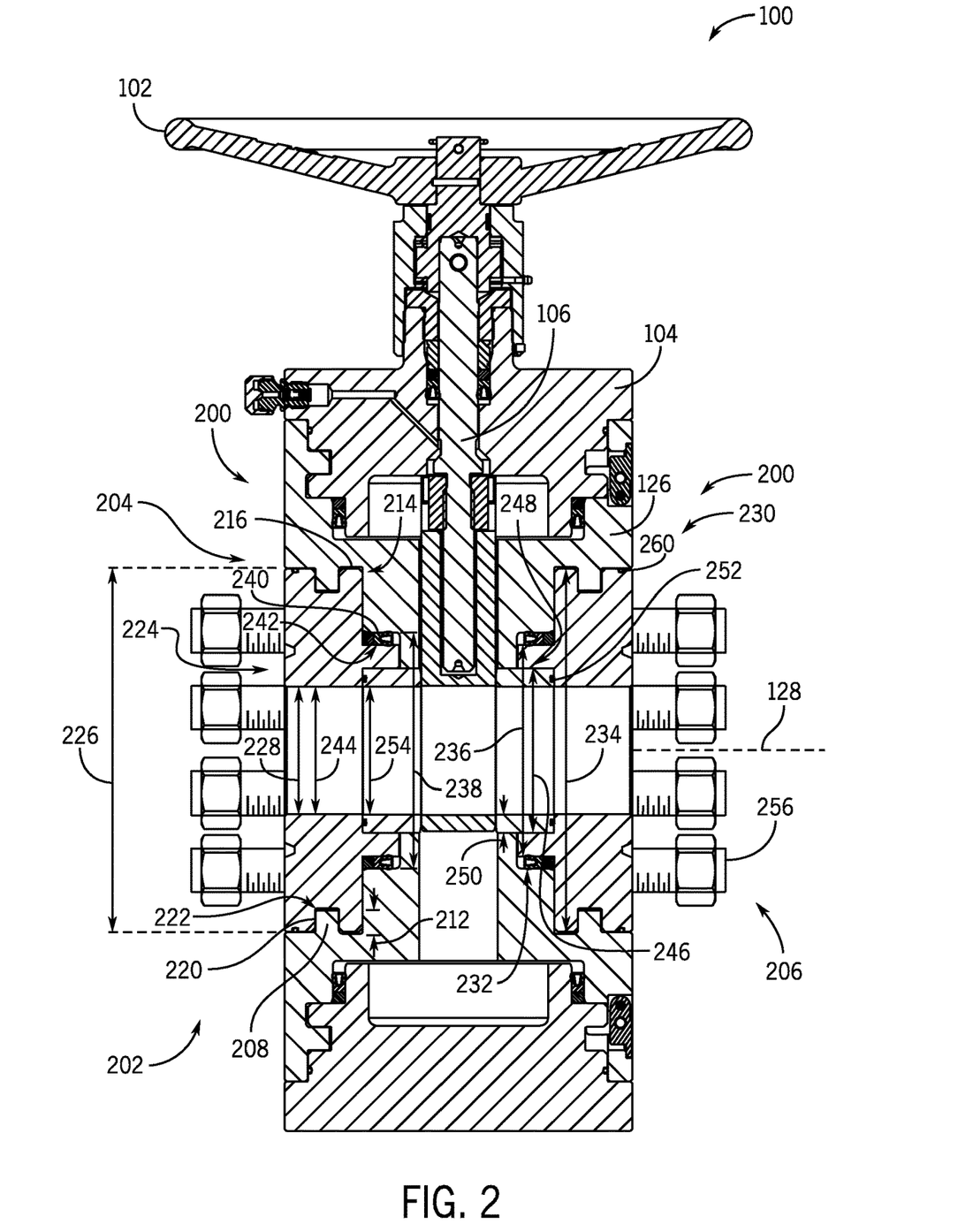
FIG. 2 is a schematic cross-sectional view of an embodiment of a valve assembly having a quick connect fluid end, in accordance with embodiments of the present disclosure.

FIG. 2 is a cross sectional view of an embodiment of the valve assembly 100, in which the actuator 102 has been replaced with a manual actuator that corresponds to a hand wheel. As noted above, embodiments of the present disclosure may be utilized with either manual or automated actuators. Further illustrated in the disclosure of FIG. 2 is the bonnet 104 configured to couple to the actuator 102 using a quick connection system, such as the system described in U.S. patent application Ser. No. 16/728,213, titled "No-Bolt Valve Assembly System," filed Dec. 27, 2019 by Baker Hughes Oilfield Operations LLC, which is hereby incorporated by reference in its entirety.

In the illustrated embodiment, the valve assembly 100 includes a quick connection system 200. For example, an inlet end 202 (e.g., first end) couples to a replaceable fluid end 204 (e.g., fluid end) via the quick connection system 200. It should be appreciated that a mirrored system may be arranged at an outlet end 206 (e.g., a second end), but for clarity and conciseness the quick connection system 200 will be described with reference to the inlet end 202. The inlet end 202 includes a plurality of body lugs 208 formed along the valve body 126. In various embodiments, the plurality of body lugs 208 are arranged circumferentially about a circumference of the valve body 126 and include spaces 210 (FIGS. 5A and 5B) between adjacent lugs, which will be illustrated and described later herein. The respective lugs 208 extend radially inward toward the valve body axis 128 for a body lug distance 212. It should be appreciated that the body lug distance 212 may be a variety of different sizes and may be based, at least in part, on an expected operating pressure of the valve. For example, larger lugs may be utilized in high pressure applications.

Further illustrated is a slot 214 arranged axially closer to the valve stem 106 than the lugs 208 (e.g., radially closer with respect to the valve stem 106). The slot 214 is arranged to receive a plurality of fluid end lugs 216 when the fluid end 204 is positioned in a secured or engaged position. For example, the fluid end 204 includes the plurality of fluid end lugs 216 that are circumferentially spaced about the fluid end 204. Gaps 218 (FIGS. 5A and 5B) are arranged between adjacent fluid end lugs 216, thereby permitting access to the body lugs 208 when the gaps 218 and the body lugs 208 are aligned. In various embodiments, the gaps 218 are substantially the same size or larger than the body lugs 208 to permit passage of the body lugs 208 through the gaps 218. The fluid end further includes a shoulder 220. The shoulder 220, at least partially and in combination with the fluid end lugs 216, forms a fluid end slot 222 for receiving the body lugs 208.

In operation, the fluid end 204 is aligned with an opening 224 formed in the valve body 126. The opening 224 illustrated in FIG. 2 has a larger opening diameter 226 than a bore diameter 228. The fluid end 204 is positioned such that the fluid end lugs 216 are aligned with the spaces 210, and as a result, the fluid end 204 may be moved axially along the valve body axis 128 (e.g., toward the valve stem 106) such that the fluid end lugs 216 pass through the spaces 210 and the body lugs 208 pass through the gaps 218. Thereafter, the fluid end 204 and/or the valve body 126 may be rotated about the valve body axis 128 to align the fluid end lugs 216 with the body lugs 208. As a result, further axial movement is restricted. In this manner, the fluid end 204 may be replaced or removed without utilizing external fasteners, such as bolts.

The illustrated fluid end 204 includes an outer portion 230 (e.g., farther away from the valve stem 106 when the fluid end 204 is installed in the valve body 126) and an inner portion 232 (e.g., closer to the valve stem 106 when the fluid end 204 is installed in the valve body 126). The outer portion 230 has an outer portion diameter 234 that is larger than an inner portion diameter 234. As a result, axial movement along the valve body axis 128 is blocked by a transition between the opening diameter 226 and a second opening diameter 238 (e.g., inner opening diameter 226). This inner opening diameter 238 is illustrated as being greater than the inner portion diameter 236, and as a result, a seal 240 may be arranged within the void space 242 between the inner portion 232 and the inner opening diameter 238. In various embodiments, the seal may be a metallic or polymer seal (or combination thereof or other material) and may block fluid from flowing out of the bore 124. That is, in various embodiments, metal to metal seals may be formed, which may be advantageous in high pressure operations. In certain embodiments, the seal 240 may also include a biasing member, or may be replaced with a biasing member, to drive the body lugs 208 in an opposite axial direction and into the shoulder 220. Further illustrated is an environmental seal 260 between the fluid end 204 and the valve body 126. The environmental seal 260 is shown as being farther away, along the axis 128, from the valve stem 106 than the fluid end lugs 216. That is, a distance between the environmental seal 260 and the valve body 126 is larger than a distance between the fluid end lugs 216 and the valve body 126. Additionally, the environmental seal 260 is shown as being farther away, along the axis 128, from the valve stem 106 than the valve body lugs 208. That is, a distance between the environmental seal 260 and the valve body 126 is larger than a distance between the valve body lugs 208 and the valve body 126.

In the illustrated embodiment, the outer portion 230 includes an inner diameter 244 that is substantially equal to the bore diameter 238. The inner portion 232, however, includes an inner portion inner diameter 246 that is larger than the inner diameter 244. As a result, the inner portion 232 includes a recessed portion 248 for receiving the valve seat 122. In various embodiments, the recessed portion 248 has a wall thickness 250 that substantially aligns the inner portion inner diameter 246 with the bore diameter 228. As a result, the valve seat 122 may be positioned to engage both the fluid end 204 and the valve member 110.

The illustrated valve seat 122 is positioned within the recessed portion 248 and may include a biasing member and/or seal 252. The valve seat 122 includes a valve seat inner diameter 254 that is substantially equal to the bore diameter 228, and as a result, the combination of the valve seat 122 and the fluid end 204 may, at least in part, form the valve bore 124. Accordingly, damage to the valve bore 124 may be rapidly replaced. For example, the fluid ends 204 may be quickly removed using features of the quick connection system 200 while the valve seat 122 may also be removed from the recessed portion 248 and also benefit from the quick connection system.

In the embodiment of FIG. 2, the fluid end 204 includes fasteners 256 to couple other components, such as additional piping components and the like, to the valve assembly 100. It should be appreciated that the fasteners 256 may be replaced with a different coupling system, such as a flange or a prepared welding surface, in various embodiments. For example, the fluid end 204 may be replaced with a different fluid end having a different coupling system. This may facilitate use of valves in a variety of different configurations and reduce a quantity of equipment transported and stored at a well site. By way of example only, a well site may keep a number of different configurations of fluid ends to enable quick replacements between those that use fasteners, flanges, and the like.

Figure 3:
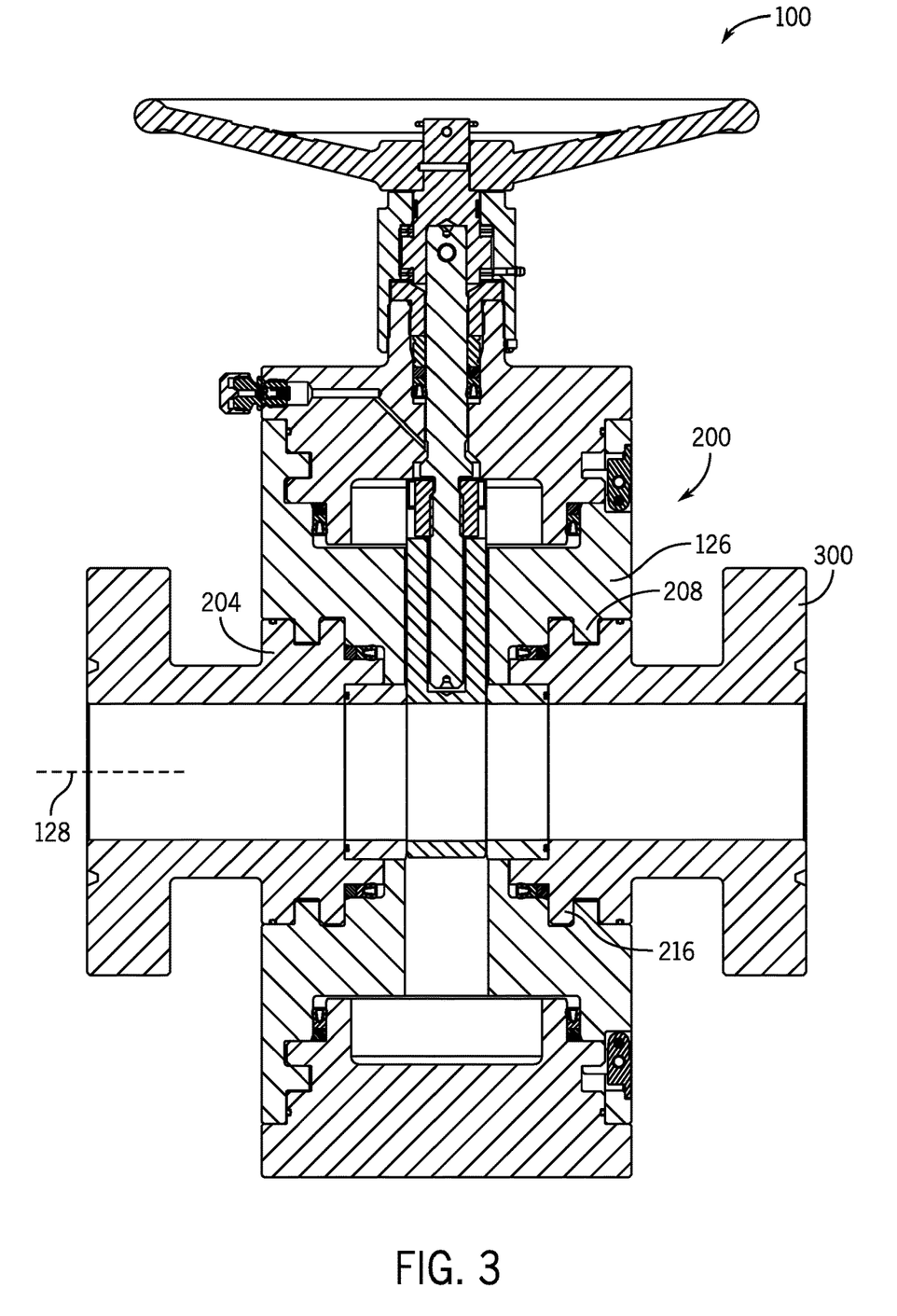
FIG. 3 is a schematic cross-sectional view of an embodiment of a valve assembly having a quick connect fluid end, in accordance with embodiments of the present disclosure.

FIG. 3 is a cross-sectional view of an embodiment of the valve assembly 100 including the quick connection system 200 for replacing the fluid ends 204. The illustrated valve body 126 includes the body lugs 208 described above that interact with the fluid end lugs 216 to block axial movement of the fluid end 204 along the valve body axis 128. In the illustrated embodiment, the fluid ends 204 include flanged connectors 300, rather than the fasteners 258 illustrated in FIG. 2. As noted above, the fluid ends 204 may be replaced to change out the associated connectors. Moreover, it should be appreciated that while FIGS. 2 and 3 illustrate fluid ends 204 having the same connection type, in various embodiments different fluid ends may have different connection types. For example, one fluid end may have a flanged connection while another includes fasteners, such as bolts.

It should be appreciated that various systems and methods may be deployed in order to prevent inadvertent rotation of the fluid end 204. For example, in embodiments, a key or tool may extend through an opening formed on a fluid end face. The key or tool may extend into one of more spaces 210 and/or gaps 218 to block rotation of the fluid end 204 while the key or tool is arranged within the one or more spaces 210 and/or gaps 218. This locking mechanism may be arranged on the fluid end face. That is, the locking mechanism may be incorporated into the fluid end face. This locking mechanism is not illustrated in FIGS. 2 and 3 for clarity and conciseness with the discussion.

Figure 4:
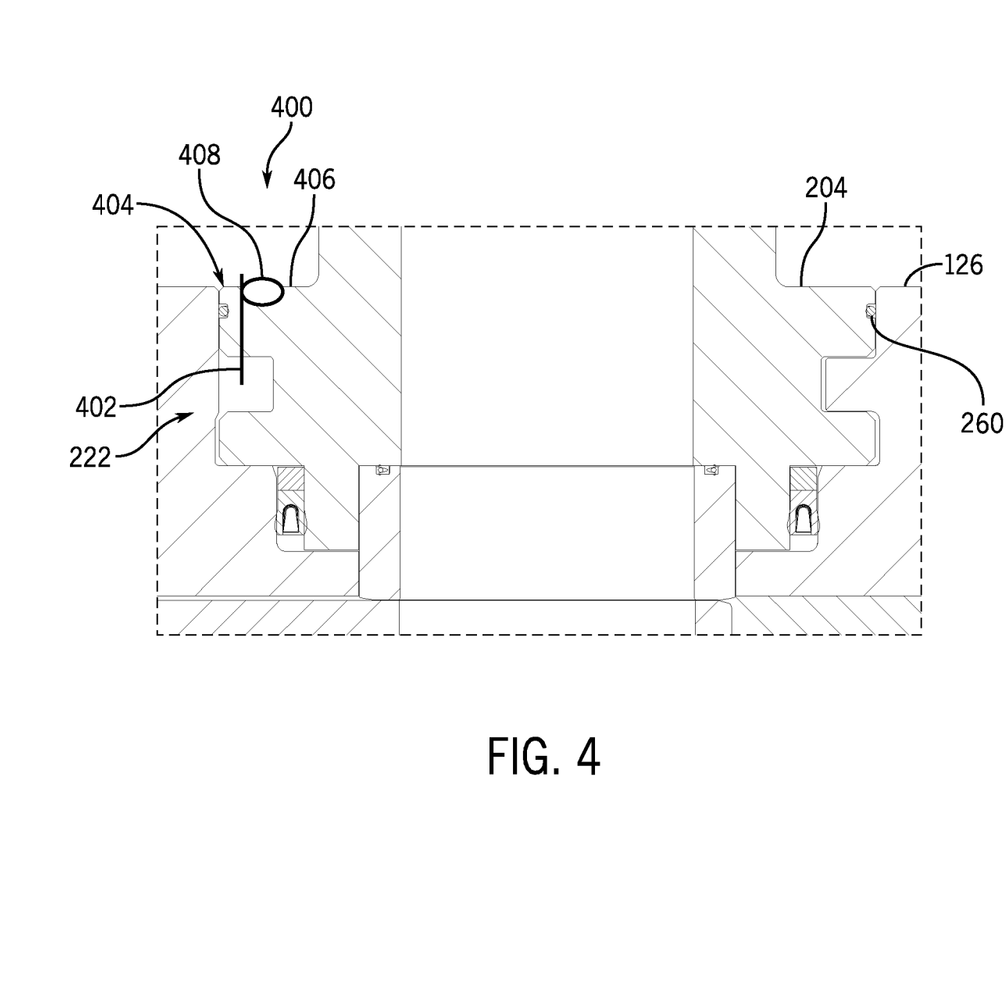
FIG. 4 is a schematic partial cross-sectional view of an embodiment of a quick connect fluid end, in accordance with embodiments of the present disclosure.

FIG. 4 is cross-sectional view of an embodiment of a locking mechanism 400 that may be incorporated and/or utilized with the quick connection system 200 in various embodiments. It should be appreciated that the locking mechanism 400 illustrated herein is for example purposes and that other methods may also be deployed to prevent inadvertent or undesirable rotation of the fluid end 204, such as fasteners and the like. The locking mechanism 400 includes a stop member 402 that may be moved to extend through an orifice 404 formed in a face 406 of the fluid end 204. The stop member 402 may be part of a rotating mechanism 408 that enables movement of the stop member from a blocking position (not illustrated) to a neutral position (illustrated in FIG. 4). In the blocking position, the stop member 402 extends into the fluid end slot 222, for example, by extending through a gap 218 between the fluid end lugs 216. As a result, rotation of the fluid 204 is blocked via contact between the stop member 402 and the body lugs 208. In this manner, the fluid end 204 may be secured into position.

Figure 5A:
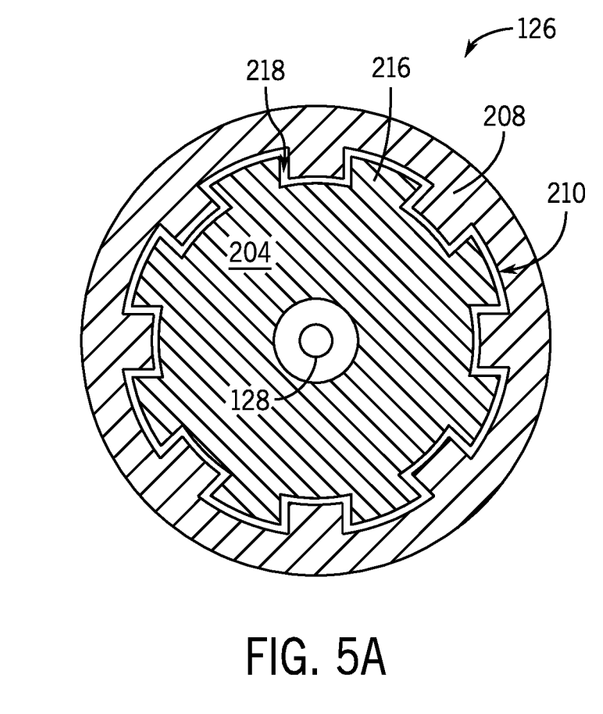
FIGS. 5A and 5B are schematic top views of embodiments of a quick connect fluid end, in accordance with embodiments of the present disclosure.
Figure 5B:
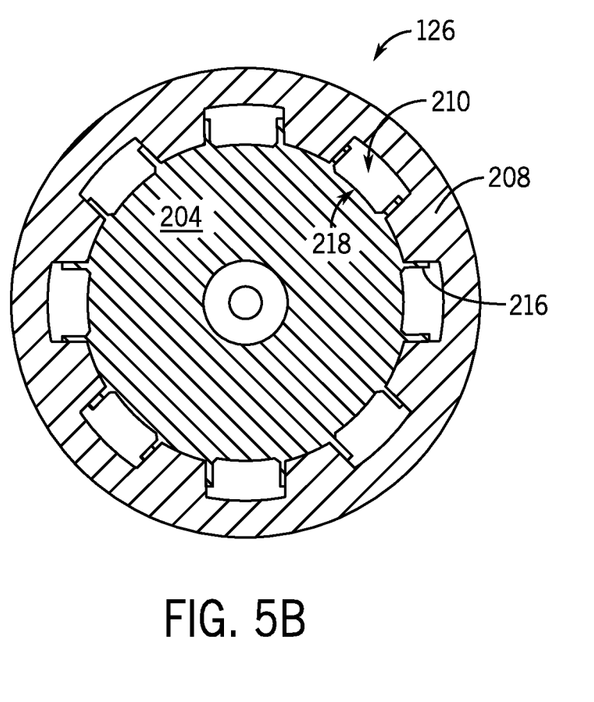

FIGS. 5A and 5B are top plan cross-sectional views of an embodiment of the fluid end 204 interfacing with the valve body 126 via valve body lugs 208 and fluid end lugs 216. In the illustrated embodiment, the fluid end 204 is arranged circumferentially within at least a portion of the valve body 126. However, other portions of the fluid end 204 may be outside of the valve body 126 or substantially aligned with the valve body 106. It should also be appreciated that various components have been removed for clarity with the following discussion.

In the illustrated embodiment, the valve body lugs 208 extend radially inward toward the valve body axis 128. The illustrated valve body lugs 208 are arranged within the gaps 218 positioned between adjacent fluid end lugs 216. The fluid end lugs 216 extend radially outward from the valve body axis 128 and are positioned within spaces 210 between the valve body lugs 208. The arrangement illustrated in FIG. 5A enables the axial movement of the fluid end 204 and/or the valve body 126 along the axis 128. For example, the fluid end 204 may be moved through the spaces 210 such that the fluid end lugs 216 are arranged within the valve body slot 214.

In operation, at least one of the valve body 126 and the fluid end 204 may be rotated to align, at least partially, the fluid end lugs 216 with the valve body lugs 208, as illustrated in FIG. As a result, axial movement between the valve body 126 and the fluid end 204 is blocked due to the interference between the fluid end lugs 216 and the valve body lugs 208. In various embodiments, the rotation is less than one full rotation of the valve body 126 and/or the fluid end 204. For example, the rotation can be approximately 10 degrees, approximately 20 degrees, approximately 30 degrees, approximately 40 degrees, approximately 50 degrees, approximately degrees, approximately 70 degrees, approximately 80 degrees, approximately 90 degrees, approximately 100 degrees, approximately 110 degrees, approximately 120 degrees, approximately 130 degrees, approximately 140 degrees, approximately 150 degrees, approximately 160 degrees, approximately 170 degrees, approximately 180 degrees, approximately 190 degrees, approximately 200 degrees, approximately 210 degrees, approximately 220 degrees, approximately 230 degrees, approximately 240 degrees, approximately 250 degrees, approximately 260 degrees, approximately 270 degrees, approximately 280 degrees, approximately 290 degrees, approximately 300 degrees, approximately 310 degrees, approximately 320 degrees, approximately 330 degrees, approximately 340 degrees, approximately 350 degrees, or any other reasonable rotational amount. Moreover, the fluid end gaps 218 and the valve body spaces 210 are substantially aligned.

It should be appreciated that while the embodiments illustrated in FIGS. 5A and 5B include an equal number of fluid end lugs 216 and valve body lugs 208, that in other embodiments that may not be an equal number. For example, there may be more fluid end lugs 216 than valve body lugs 208. Furthermore, while the illustrated embodiment includes eight fluid end lugs 216 and eight valve body lugs 208, any other reasonable number of lugs 208, 216 may be included.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A valve assembly, comprising:
   an actuator adapted to drive movement of a valve member axially along a vertical axis between an open position and a closed position;
   a bonnet coupled to the actuator;
   a valve body coupled to the bonnet;
   a fluid end coupled to the valve body;
   a quick connection system adapted to couple the fluid end to the valve body, the quick connection system comprising:
      a plurality of valve body lugs separated by a plurality of spaces, the plurality of valve body lugs extending radially outward from an axis;
      a plurality of fluid end lugs configured to interact with the plurality of valve body lugs, the plurality of valve body lugs being arranged to axially align with the plurality of fluid end lugs to block axial movement of the fluid end with respect to the valve body; and
   an environmental seal positioned within a recess formed in the fluid end, the environmental seal arranged external to the plurality of valve body lugs and the plurality of fluid end lugs, wherein the environmental seal is positioned at a first position, the plurality of valve lugs are positioned at a second position, and the plurality of valve body lugs are positioned at a third position, along a horizontal axis of the fluid end, such that a first distance between the first position and the valve member is greater than a second distance between the second position and the valve member and a third distance between the third position and the valve member, wherein the environmental seal is positioned at an interface between the valve body and the fluid end at an outer diameter of the fluid end; and
   a valve seat arranged within a recessed portion formed in the fluid end, the fluid end being removable from the valve body through a common opening, and the valve seat being removable from the valve body through the common opening when the bonnet is coupled to the valve body, wherein the valve seat is positioned to engage the valve member as the valve member moves axially to the closed position, and the valve seat extends away from the quick connection system along the horizontal axis, perpendicular to the vertical axis, to a location that is closer to the valve member than the plurality of valve body lugs and the plurality of fluid end lugs.

2. The valve assembly of claim 1, further comprising:
   a slot formed, at least in part, by the plurality of valve body lugs, the slot arranged axially closer to a valve stem than the valve body lugs, and the slot receiving the plurality of fluid end lugs.

3. The valve assembly of claim 1, further comprising:
   a plurality of fluid end gaps arranged between the fluid end lugs, wherein each fluid end lug pair is separated by a fluid end gap of the plurality of fluid end gaps.

4. The valve assembly of claim 1, wherein the fluid end further comprises:
an outer portion having an outer portion diameter; and
an inner portion having an inner portion diameter, the outer portion diameter being larger than the inner portion diameter.

5. The valve assembly of claim 4, wherein the recessed portion is formed in the inner portion.

6. The valve assembly of claim 1, further comprising:
a seal arranged between an outer diameter of the fluid end and an inner diameter of the valve body.

7. The valve assembly of claim 1, wherein the fluid end further comprises:
a connector for engaging process equipment, the connector including at least one of a flanged end, a threaded end, a welded end, or a combination thereof.

8. A valve assembly, comprising:
an actuator configured to drive movement of a valve stem between a first position and a second position;
a valve body, having a chamber for a valve member coupled to the valve stem, wherein movement of the valve stem drives movement of the valve member between the first position and the second position, the movement of the valve stem is along a vertical axis of the valve body, the first position permits flow through a passage extending along a horizontal axis of the valve body, and the second position blocks flow through the passage;
a fluid end adapted to couple to the valve body, the fluid end having a plurality of fluid end lugs, extending radially outward from a horizontal axis and arranged circumferentially about the fluid end, the plurality of fluid end lugs separated by respective gaps of a plurality of gaps, the fluid end being translatable along the horizontal axis between a coupled position and a decoupled position, wherein the plurality of fluid end lugs axially move through a plurality of valve body slots as the fluid end transitions from the decoupled position to the coupled position, and the fluid end is rotatably placed into the coupled position after moving through the plurality of valve body slots;
an environmental seal positioned between the fluid end and the valve body at an outer radial diameter of the fluid end between the valve body and the fluid end at an interface between the valve body and the fluid end, the environmental seal arranged within a groove formed in the fluid end and positioned external to the plurality of fluid end lugs and the plurality of valve body slots along the horizontal axis such that the plurality of fluid end lugs are closer to the vertical axis than the environmental seal; and
a valve seat arranged within a recessed portion formed in the fluid end, the valve seat being removable from the valve body through a common opening, and the fluid end being removable from the valve body through the common opening when the actuator is coupled to the valve body, wherein the valve seat is positioned to engage the valve member as the valve member moves axially to the second position, and the valve seat extends away from the plurality of fluid end lugs along the horizontal axis, to a location that is closer to the valve member than the plurality of fluid end lugs.

9. The valve assembly of claim 8, wherein the valve body further comprises:
a plurality of valve body lugs, wherein pairs of valve body lugs are separated by respective valve body slots of the plurality of valve body slots, the plurality of valve body lugs being at least partially aligned with the fluid end lugs when the fluid end is in the coupled position.

10. The valve assembly of claim 9, further comprising:
a slot formed in the valve body, the slot receiving the fluid end lugs; and
a fluid end slot formed in the fluid end, the fluid end slot receiving the plurality of valve body lugs.

11. The valve assembly of claim 8, wherein the fluid end forms at least a portion of a valve bore.

12. The valve assembly of claim 8, wherein an inner face of the recessed portion is aligned with respective rear faces of the plurality of fluid end lugs.

13. The valve assembly of claim 8, wherein a metal to metal seal is formed between the valve body and the fluid end.

14. A valve assembly comprising:
a valve member driven to move axially along a vertical axis between an open position and a closed position;
a fluid end having a plurality of fluid end lugs extending radially outward from a horizontal axis, the plurality of fluid end lugs each having a first circumferential length less than an outer circumference of the fluid end, wherein each fluid end lug is separated from an adjacent fluid end lug by a gap, the plurality of fluid end lugs forming at least a portion of a fluid end slot;
a valve body having a plurality of valve body lugs extending radially inward toward the horizontal axis, the plurality of valve body lugs each having a second circumferential length less than an outer circumference of the valve body, wherein each valve body lug is separated from an adjacent valve body lug by a space, the valve body having a passage extending along the horizontal axis, wherein the valve member is positioned to block the passage when in the closed position;
an environmental seal between the fluid end and the valve body at an interface at an outer diameter of the fluid end, the environmental seal positioned external, along the horizontal axis, to the plurality of fluid end lugs and the plurality of valve body lugs such that each of the plurality of valve body lugs and the plurality of fluid end lugs are closer to the valve member, along the horizontal axis, than the environmental seal; and
a valve seat arranged within a recessed portion formed in the fluid end, the valve seat being removable from the valve body through a common opening, and the fluid end being removable from the valve body through the common opening when an actuator is coupled to the valve body at an opening that is arranged along the vertical axis, wherein the valve seat is positioned to engage the valve member as the valve member moves axially to the closed position, and the valve seat extends away from the plurality of valve body lugs along the horizontal axis, to a location that is horizontally closer to the valve member than the plurality of valve body lugs;
wherein the first circumferential length is less than a space circumferential length to permit passage of the plurality fluid end lugs through respective space when the plurality fluid end lugs are aligned with the spaces, and wherein axial movement of the fluid end relative to the valve body is blocked when the plurality of valve body lugs, arranged within the fluid end slot, are axially aligned with the plurality of fluid end lugs.

15. The valve assembly of claim 14, further comprising:
a slot formed, at least in part, by the plurality of valve body lugs, the slot arranged axially inward from the plurality of valve body lugs, the slot receiving the plurality of fluid end lugs.

16. The valve assembly of claim 14, further comprising:
a seal positioned between the fluid end and the valve body, the seal being a metallic seal, a polymer seal, or a combination thereof.

17. The valve assembly of claim 14, wherein an inner face of the recessed portion is aligned with respective rear faces of the plurality of fluid end lugs.

\* \* \* \* \*